United States Patent
Michna et al.

(10) Patent No.: US 12,035,068 B2
(45) Date of Patent: Jul. 9, 2024

(54) PROVIDING VIDEO CONTENT FOR PRE-BOOT AND POST-BOOT ENVIRONMENTS OF COMPUTER PLATFORMS

(71) Applicant: HEWLETT PACKARD ENTERPRISE DEVELOPMENT LP, Houston, TX (US)

(72) Inventors: Vincent W. Michna, Houston, TX (US); Yasir Jamal, Cypress, TX (US); Peter A. Hansen, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 288 days.

(21) Appl. No.: 17/449,572

(22) Filed: Sep. 30, 2021

(65) Prior Publication Data
US 2023/0099385 A1    Mar. 30, 2023

(51) Int. Cl.
*H04N 5/268* (2006.01)
*G06F 13/40* (2006.01)

(52) U.S. Cl.
CPC ......... *H04N 5/268* (2013.01); *G06F 13/4022* (2013.01)

(58) Field of Classification Search
None
See application file for complete search history.

(56) References Cited

U.S. PATENT DOCUMENTS

| | | | | |
|---|---|---|---|---|
| 5,189,401 | A * | 2/1993 | Kugler, Jr | G09G 5/02 345/589 |
| 5,943,065 | A | 8/1999 | Yassaie et al. | |
| 7,080,181 | B2 | 7/2006 | Wolford | |
| 9,817,459 | B2 | 11/2017 | Gonzales et al. | |
| 11,593,052 | B1 * | 2/2023 | Michna | G06F 3/023 |
| 2010/0318704 | A1 | 12/2010 | Siulinski et al. | |
| 2021/0034452 | A1 * | 2/2021 | Tan | G06F 11/327 |

OTHER PUBLICATIONS

BIOS Setup (For Purley Platform) User's Guide Rev.1.0; Author: Giga-Byte Technology Co., Ltd; Published: 2017, Retrieved Aug. 4, 2021, 89 Pgs.

* cited by examiner

*Primary Examiner* — Farley Abad
*Assistant Examiner* — Dayton Lewis-Taylor
(74) *Attorney, Agent, or Firm* — Trop, Pruner & Hu, P.C.

(57) ABSTRACT

A process includes, responsive to a computer platform being in a pre-operating system mode of operation, a first controller receiving serial data from a first external communication connector of the computer platform and the first controller providing a video output based on the serial data; and routing the video output of the first controller to a display device connector. The process includes, determining whether a video driver of the computer platform is communicating with a second controller via a second external communication connector of the computer platform. The video driver is associated with an operating system mode of operation of the computer platform. The process includes, in response to determining that the video driver is communicating with the second controller, routing a video output of the second controller to the display device connector in place of the video output of the first controller.

20 Claims, 7 Drawing Sheets

NON-TRANSITORY STORAGE MEDIUM

MACHINE-READABLE INSTRUCTIONS THAT, WHEN EXECUTED BY MACHINE, CAUSE MACHINE TO:

- RESPONSIVE TO RECEIVING DATA FROM EXTERNAL SERIAL PORT OF COMPUTER PLATFORM, PROVIDE VIDEO SIGNALS TO FIRST INPUT LINES OF MULTIPLEXER
- DETERMINE WHETHER VIDEO CONTROLLER IS COMMUNICATING WITH OPERATING SYSTEM-BASED DRIVER OF COMPUTER PLATFORM, WHERE VIDEO CONTROLLER INCLUDES OUTPUT LINES COUPLED TO SECOND INPUT LINES OF MULTIPLEXER, VIDEO CONTROLLER IS COUPLED TO EXTERNAL SERIAL BUS PORT OF COMPUTER PLATFORM, AND VIDEO CONTROLLER TO PROVIDE VIDEO CONTENT TO OUTPUT LINES RESPONSIVE TO OPERATING SYSTEM-BASED DRIVER COMMUNICATING DISPLAY CONTENT WITH VIDEO CONTROLLER
- CONTROL WHETHER MULTIPLEXER COUPLES FIRST INPUT LINES OR SECOND INPUT LINES TO VIDEO DISPLAY DEVICE CONNECTOR BASED ON DETERMINATION

PROVIDING VIDEO CONTENT FOR PRE-BOOT AND POST-BOOT ENVIRONMENTS OF COMPUTER PLATFORMS

BACKGROUND

A server is a computer platform that provides, or serves, information. The server may be a physical server, i.e., an actual, physical machine that is formed form actual hardware and software. The server may be a virtual server, or an abstraction of actual hardware and software, such as a virtual machine. Moreover, the hardware and software of a given physical server may support one or multiple virtual servers.

The server may take on one of a number of different forms that provide benefits for different server applications. For example, a blade server has a form factor that takes up a relatively small amount of space (as compared to other server platforms). The small size may be particularly advantageous for optimizing processing power density in a data center. For example, several (e.g., eight) multi-processor blade servers may be installed in a blade server enclosure, and several (e.g., seven) of the blade server enclosures may be mounted in a single rack. A blade server may provide various benefits other than a small size, such as a hot-swapping capability, a relatively small power consumption footprint, a relatively large processing throughput, and so forth. A blade server may be "headless," which refers to the blade server lacking a built-in video controller (i.e., the blade server does not have the capability to produce video content for a "head," or display device).

DETAILED DESCRIPTION

Managing (e.g., configuring, performing maintenance, debugging, and so forth) a headless computer platform (e.g., a headless blade server) involves input/output (I/O) interaction with the computer platform. This I/O interaction may involve a user providing input (e.g., mouse and/or keyboard input) to the computer platform, and the computer platform providing an output. I/O interaction with a headless computer platform may be local in nature within a data center and may involve an onsite user connecting one or multiple cables to I/O connectors of the headless computer platform.

Due to the headless computer platform not having a built-in video controller, the non-video output that is provided by the computer platform may be rather limited. For example, for local, onsite access to a headless computer platform, a user may connect a serial port cable (e.g., a Recommended Standard 232 (RS-232) cable) to a serial port connector (e.g., RS-232 connector) of the headless computer platform. The serial port connector output may be text-based in that the output may be a stream of data representing alphanumeric text characters. Because a headless computer platform does not provide video content, the platform's output may not support an operating system-based graphical user interface (GUI).

Blade servers may be used provide compute nodes (e.g., four compute nodes per blade server) for a cluster. In general, in a cluster, compute nodes are interconnected to combine their individual processing powers to function as a single, high performance machine. A cluster may be used for a number of different purposes, such as load balancing, high availability (HA) server applications and parallel processing.

For a relatively large-scale compute cluster (e.g., an exascale cluster) that has hundreds, if not thousands, of headless blade servers in one or multiple data centers, the absence of video controllers on the blade servers may provide certain benefits (reduced costs, server space conservation, reduced server complexities, and so forth) that outweigh the disadvantage of no blade server-provided video content. Moreover, such a large-scale computer system may be set up with resources to facilitate large scale server management and configuration operations that accommodate the lack of blade server-provided video content. However, for a smaller-scale computer system, customers may prefer or expect local video content to be available for the headless blade servers of the system.

One approach to add video capabilities to a headless blade server is to connect a video controller to an external connector of the server, which supports the use of the video controller. For example, a Universal Serial Bus (USB)-based video controller may be hot-plugged into an external USB port connector of a headless blade server. The video controller may be incapable of providing video content for the headless blade server for all states, or environments, of the server, however. For example, a hot-pluggable USB-based video controller may be constructed to be driven by an operating system-based USB video controller driver of the headless blade server. Therefore, without the video driver, the hot-pluggable video controller does not provide video content. Because the use of the USB-based video controller is tied to the blade server's operating system, the USB-based video controller is not available for providing video content when the server is in a pre-boot environment, i.e., before the server's operating system has booted. This means that a hot-pluggable USB-based video controller does not provide video content for pre-boot environment-related output (e.g., a Read Only Memory (ROM)-Based Setup Utility (RBSU) menu, a Unified Extensible Firmware Interface (UEFI) shell, and so forth) of the blade server.

In accordance with example implementations that are described herein, a video adapter is constructed to provide video content for a computer platform (e.g., a headless blade server) to a video display device connector for both a pre-boot environment of the computer platform (i.e., the state, or environment, of the computer platform before the platform's operating system loads) and a post-boot environment of the computer platform (i.e., the state, or environment, of the computer platform after the platform's operating system loads). As described herein, in accordance with example implementations, for the computer platform's pre-boot environment, the video adapter converts a first, non-video content-based output from the computer platform into a corresponding video content for the video display device connector. Responsive to the video adapter detecting the computer platform being in the post-boot environment, the video adapter allows a video driver of the computer platform to drive a video controller of the video adapter to provide video content for the video display device connector.

In accordance with example implementations, the video adapter may be constructed to connect to one or multiple external connectors of the computer platform to receive output from the computer platform; and in accordance with further example implementations, the video adapter may be constructed to connect to one or multiple internal connectors of the computer platform.

For example, in accordance with example implementations, the video adapter is constructed to be hot-plugged into both a hot-pluggable, external serial bus port connector (e.g., an external USB connector) and a hot pluggable, external serial port connector (e.g., an RS-232 connector) of the headless computer platform. As further described herein, when the headless computer platform is in the pre-boot environment, the video adapter converts a serial stream of data received from the serial port connector into video content; and when the headless computer platform is the post-boot environment, a video controller (e.g., a USB-based video controller) of the video adapter is driven by a video driver of the platform (via the serial bus port connector) to provide the video content. In accordance with example implementations, the video adapter includes a single display device connector (e.g., a Video Graphics Array (VGA), a DisplayPort (DP) or a (Digital Visual Interface (DVI) connector) that may be connected to a display device (e.g., a monitor), and the video adapter controls which source (the serial stream conversion or the video controller) is providing the video content to the display device connector based on the environment of the computer platform.

For the above-described implementation in which the video adapter is connected to the external serial port connector and external serial bus port connector of the computer platform, the video adapter may be considered to be external to the computer platform. In accordance with further implementations, the components of the video adapter may be mounted to a circuit substrate (e.g., a midplane printed circuit board) that is separate from the motherboard(s) of the computer platform and mounted to the same chassis, or frame, as the motherboard(s). For these implementations, the video adapter may, in general, may be considered to be external to the computer platform. Therefore, the video adapter may be connected to multiple internal connectors of the computer platform or may be connected to multiple external connectors of the computer platform, depending on the particular implementation. Moreover, as further described herein, in accordance with further implementations, the internal or external video adapter may be coupled to a single connector of the computer platform, for purposes of receiving an output of the computer platform, which the video adapter uses to provide video content for the computer platform for both the pre-boot and post-boot environments of the computer platform. In accordance with yet a further example implementation, for purposes of receiving outputs from the computer platform, the video adapter may be connected to one or multiple external connectors of the computer platform and connected to one or multiple internal connectors of the computer platform.

In accordance with example implementations, for the pre-boot environment of the headless computer platform, a managing controller (e.g., a microcontroller) of the video adapter converts a stream of serial data that the controller receives from the platform's external serial port connector into text character content-based video content; and the video adapter routes the text character-based video content to the display device connector. Moreover, in accordance with example implementations, for the post-boot environment of the headless computer platform, the video controller of the video adapter communicates, via the external serial bus port connector of the platform, with a video controller driver of the platform to produce a graphical content-based video content; and the video adapter routes the graphical content-based video content (instead of the text character-based video content) to the display device connector.

In accordance with example implementations, the managing controller, in addition to providing video conversion during the headless computer platform's pre-boot environment, manages, or controls, which content (the text character-based video or graphical content-based video content) is routed to the display device connector, based on the managing controller's assessment of whether the headless computer platform is in the pre-boot environment or the post-boot environment. More specifically, in accordance with example implementations, the video adapter includes a multiplexer to control which video content is routed to the display device connector. The managing controller monitors an operation and/or output of the video adapter's video controller for purposes of determining whether the headless computer platform is in the pre-boot environment or in the post-boot environment. This determination may involve, for example, the managing controller determining whether the video controller is providing video content. Based on a result of this determination, in accordance with example implementations, the managing controller controls a selection state of the multiplexer. In this manner, in accordance with example implementations, responsive to the managing controller determining that the computer platform is operating in the pre-boot environment, the managing controller controls the multiplexer's selection state to cause the multiplexer to route the text character-based video content that is provided by the managing controller to the display device connector; and responsive to the managing controller determining that the headless computer platform is operating in the post-boot environment, the managing controller controls the multiplexer's selection state to cause the multiplexer to route the video content provided by the video controller to the display device connector. Accordingly, in accordance with example implementations, from the perspective of a viewer of the display device (which is connected to the video adapter's display device connector), the video adapter seamlessly transitions between video content sources to track the environment of the computer platform.

Figures 1A, 1B:
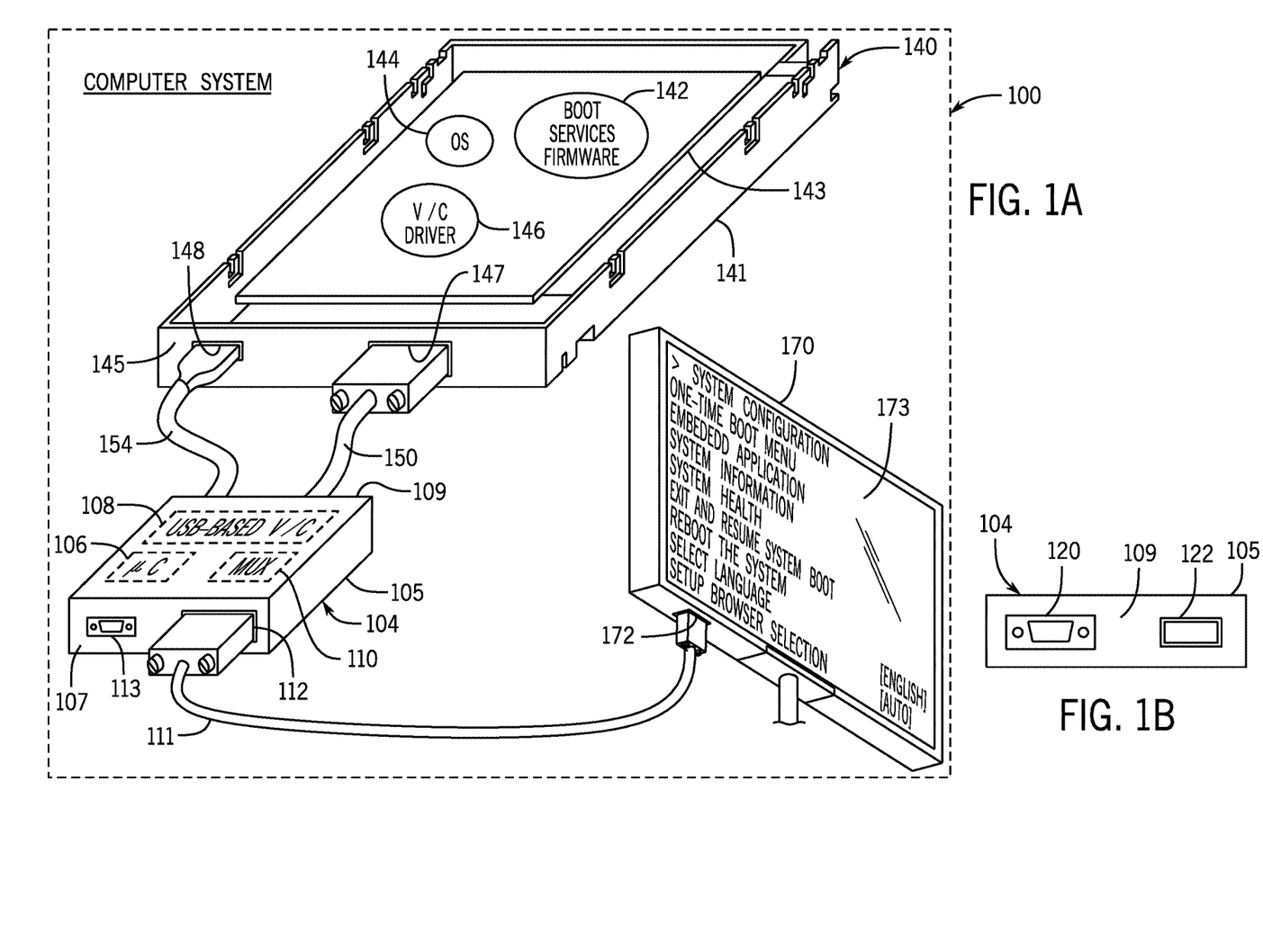
FIG. 1A is a perspective view of a computer system that includes a headless blade server, a display device, and a video adapter to provide video content for the blade server for both a pre-boot environment of the blade server and a post-boot environment of the blade server according to an example implementation.
FIG. 1B is a rear view of the video adapter of FIG. 1A according to an example implementation.

Referring to FIG. 1A, as a more specific example, a computer system 100, in accordance with example implementations, includes a "headless" computer platform 140, i.e., a computer platform 140 that does not have a built-in video controller. In this context, a "computer platform" refers to a unit including a chassis and hardware that is mounted to the chassis, which is capable of executing machine-executable instructions (or "software"). A headless blade server (depicted in FIG. 1A) is an example of a headless computer platform 140, in accordance with an example implementation. The computer platform may, however, be a platform (headless or not) other than a blade server, in accordance with further implementations, such as a rack-mounted server, a client, a desktop, a smartphone, a laptop computer, a tablet computer, and so forth.

In accordance with example implementations, for purposes of providing video content for the computer platform 140, the computer system 100 includes an external video adapter 104. For the example implementation that is depicted in FIG. 1A, the video adapter 104 is constructed to be hot-plugged into two port connectors of the computer platform 140 for purposes of receiving outputs from the platform 140: an external serial port connector, such as an external RS-232 connector 147; and an external serial bus port connector, such as an external USB connector 148. In this context, an "external connector" of the computer platform 140 refers to a connector that is accessible from the outside of the computer platform 140 (i.e., the connector is accessible without opening a housing of the computer platform 140 and/or without removing the computer platform 140 from its electrical and/or mechanical connections, such as removing a blade server from a blade enclosure). In other words, a mating connector may be plugged into the external connector.

For the example implementation that is depicted in FIGS. 1A and 1B, an RS-232 cable 150 (FIG. 1A), which contains the appropriate RS-232 connectors, connects the RS-232 connector 147 of the computer platform 140 to an external RS-232 connector 120 (see FIG. 1B, which depicts a rear face 109 of a housing 105 of the video adapter 104, without the cable 150 being connected to the RS-232 connector 120); and a USB cable 154, which contains the appropriate USB connectors, connects the external USB connector 148 of the computer platform 140 to an external USB connector 122 (see FIG. 1B, which depicts the USB connector 122 without the cable 154 being connected) of the video adapter 104. The video adapter 104 includes an external display device connector, such as a Video Graphics Array (VGA) connector 112, which provides video signals representing video content for the computer platform 140; and as depicted in FIG. 1A, the VGA connector 112 may be connected by a VGA cable 111, which contain the appropriate VGA connectors, to a VGA connector 172 of a display device, such as a monitor 170, so that the video content may be displayed on a display screen 173 of the monitor 170.

Although cables 150 and 154 are depicted in FIG. 1A for purposes of connecting the video adapter 104 to the RS-232 connector 147 and USB connector 148, respectively; in accordance with further example implementations, such cabling may not be used. For example, in accordance with further example implementations, the video adapter 104 may be a dongle-type device that has rigid connectors that plug directly into corresponding connectors of the computer platform 140. For example, in accordance with some implementations, the RS-232 connector 147 and the USB connector 148 may be female connectors, and the video adapter 104 may have corresponding male adapters that extend through the rear face 109 of the housing 105.

Although video cabling (e.g., the VGA cable 111) is depicted herein to communicate the video content to the monitor 170, in accordance with further example implementations, wireless signaling may be used. For example, in accordance with further example implementations, the video adapter 104 may include a wireless radio (e.g., a WiFi radio or a Bluetooth radio) for purposes of using radio waves to wirelessly communicate video data representing video content to a wireless radio of a display device. As another example, in accordance with further implementations, optical transceivers may be used to communicate video data representing video content.

In the context used herein, "video content" (or "video output") refers to a stream of time successive images, or frames, such as time successive frames, where each frame corresponds to the visual image to be displayed in a full video viewing window (e.g., a window corresponding to a full display screen 173 or a minimized window that occupies less than a full display screen) on a display device (such as the display device 170). The video adapter's display device connector 112 communicates a set of signals, which represent the video content (or "video data" or "video information"). The set of signals may be referred to as "video signals" (or "video output"). A frame includes a set of horizontal lines of pixels. For the example implementation of FIG. 1A, the display device connector 112 is a VGA connector, which provides a set of analog signals that represent video content. Here, "VGA" refers to the original VGA standard that was introduced in 1987, as well as variants from the original VGA standard, such as, Super VGA (SVGA), XGA and so forth. The VGA connector 112 may be, as an example, a female DE-15 connector.

The set of analog signals provided by the VGA connector 112 may include three color signals that represent respective primary pixel color components, such as red, green and blue; and the set of analog signals may embed a pixel clock signal (called an "embedded clock signal" or "embedded pixel clock signal" herein) that has timing edges to indicate when the color signals coincide with different pixels. The set of analog signals may also include synchronization signals: a horizontal synchronization signal that has synchronization pulses to demarcate horizontal lines of pixels; and a vertical synchronization signal that has synchronization pulses to demarcate the frames.

The video adapter's display device connector 112 may be a connector other than a VGA connector, such as a DVI connector, a DisplayPort connector, or an HDMI connector, in accordance with further implementations, and as such, the connector 112 may provide a set of signals other than a set of VGA signals, may be connected to a cable other than a VGA cable, and so forth.

A first component, such as the video adapter 104, being "hot-plugged" (or "hot-swapped") into a second component, such as the computer platform 140, refers to the first component being electrically and mechanically connected to the second component while the second component remains powered on. Moreover, a given component, such as the computer platform 140, being "hot-pluggable" (or "hot-plug capable," "hot-swappable," or "hot-swap capable") means that the given component recognizes (e.g., detects the presence of and allows the subsequent use of) another component that is hot-plugged into the given component, without the given component being powered down and/or powered up to recognize and allow the use of the other component. In general, one or multiple connectors, such as the RS-232 connector 147 and the USB connector 148, of a given component may be "hot-pluggable," in that the given component recognizes (e.g., detects, configures, allows interaction with, and so forth) another component being hot-plugged into the connector of the given component, without the given component powering down and/or powering up.

A "pre-boot environment" (also called a "pre-operating system environment" or a "pre-operating system mode of operation" herein) of a computer platform refers to a state of the computer platform, which is initiated after the computer platform is powered on or reset, and exists before the computer platform transfers control to an operating system. The "post-boot environment" (also called an "operating system environment" or an "operating system mode of operation" herein) of a computer platform refers to a state of the computer platform after the computer platform has loaded the operating system and transferred control to the operating system.

A user may interact with the computer platform 140 during the platform's pre-boot environment for a number of purposes, such as configuring the computer platform 140, selecting boot options, debugging, providing credentials (e.g., keys), and so forth. As such, the computer platform 140 may provide an output for such purposes as providing statuses, providing menu options, providing the results of tests, providing alerts, and so forth. A user may provide input to respond to prompts provided by the computer system output, select options, provide credentials, and so forth.

As a more specific example, during its pre-boot environment, the computer platform 140 may, for example, provide an output that represents the results of a power-on self test (POST). As another example, as part of the pre-boot environment, the computer platform 140 may provide an output that represents a configuration menu (e.g., an RBSU menu, as depicted on the display screen 173 in FIG. 1A, or a variant thereof), which may, for example, list a variety of UEFI options. These options may involve, for example, system options, network options, storage options, power management options, and so forth. As another example, in accordance with example implementations, an UEFI shell and/or a BIOS shell may be part of the pre-boot environment. As a more specific example, during the pre-boot environment, the computer platform 140 may provide an output that represents an UEFI shell, which allows a user to run UEFI shell commands and scripts, update system firmware, and so forth.

As used herein, a "serial port" connector (such as the RS-232 connector 147) refers to a connector that corresponds to a one-to-one communication interface (i.e., a "serial port interface") in which data is serially transmitted from a single endpoint (here, the endpoint corresponding to RS-232 connector 147 of the computer platform 140) to another endpoint (here, the endpoint corresponding to the RS-232 connector 120 of the video adapter 104). This serially transmitted data does not represent video content, as the data represents a serial stream, or sequence, of alphanumeric text characters. In other words, the data communicated from the RS-232 connector 147 of the computer platform 140 solely indicates, or represents, text characters and does not indicate, or represent, time successive frames of video content. As used herein, "a serial bus connector" (such as the USB connector 148) refers to a connector that corresponds to a one-to-many communication interface (i.e., a "serial bus port interface") in which data may be transmitted from a single endpoint to one of potentially multiple endpoints.

In accordance with example implementations, for purposes of producing pre-boot environment video content for the computer platform 140, the video adapter 104 receives serial data from the RS-232 connector 147; converts the serial data into video signals that represent video content; and provides the video signals to the video adapter's VGA connector 112.

As depicted in FIG. 1A, in accordance with example implementations, the computer platform 140 has an associated video controller driver, such as a USB-based video controller driver 146 (also called a "video controller driver 146" herein). Moreover, as also depicted in FIG. 1A, in accordance with example implementations, the video adapter 104 includes a corresponding USB-based video controller 108. In accordance with further implementations, the video adapter 104 may include a video controller 108 other than a USB-based video controller, in accordance with further implementations; and accordingly, the video adapter 104 may be constructed to be hot-plugged into a corresponding connector of the computer platform 140 other than a USB connector and be driven by a corresponding driver of the computer platform 140 other than a USB-based video controller driver.

Although the USB-based video controller driver 146, during the post-boot environment of the blade server 140, is capable of communicating with the USB-based video controller 108 to produce a corresponding video content (at the output of the video controller 108), the USB-based video controller driver 146 is not operational in the pre-boot environment of the computer platform 140. In other words, in accordance with example implementations, the USB-based video controller driver 146 may be part of a kernel of an operating system 144 of the computer platform 140, or at least loaded with the operating system 144.

Unlike the video content provided by the video adapter 104 for the pre-boot environment of the computer platform 140, the video content that is provided by the USB-based video controller 108 represents a graphical video content. In this manner, the graphical video content may be part of a graphical user interface (GUI) for the computer platform 140 for the computer platform's post-boot environment. Therefore, it may be beneficial for a user (and may be preferred by the user) to view graphical video content (versus a text-based video content) when available for the computer platform 140.

In accordance with example implementations, in addition to the USB-based video controller 108, the video adapter 104 includes a multiplexer 110 and a management processor, such as a microcontroller 106. In general, in accordance with some implementations, the multiplexer 110 has an output that provides video signals (i.e., signals representing video content) to the VGA connector 112. As described further herein, for the pre-boot environment of the computer platform 140, the multiplexer 110 provides video signals representing messages written by boot services firmware 142 of the computer platform 140; and for the post-boot environment of the computer platform 140, the multiplexer 110 provides video signals representing the output of the USB-based video controller 108. In this context, the "boot services firmware 142" refers to executing firmware in the pre-boot environment of the computer platform 140, such as, for example, executing POST instructions, basic input/output system (BIOS) instructions and/or UEFI instructions. The execution of such instructions causes messages (i.e., data) to be written to the serial port that corresponds to the RS-232 connector 147.

The microcontroller 106, in accordance with example implementations, manages the video content source that is selected by the multiplexer 110, and the microcontroller 106 also provides the video content for the video adapter 104 for the pre-boot environment of the computer platform 140. More specifically, in accordance with some implementations, the microcontroller 106 receives the serial data from the video adapter's RS-232 connector 120, and the microcontroller 106 responsive to the pre-boot environment of the computer platform 140, converts the received serial data into video content and provides the resulting video data to a set of corresponding input communication lines of the multiplexer 110. The microcontroller 106, in accordance with example implementations, manages the selection state of the multiplexer 110 so that, for the pre-boot environment of the computer platform 140, the multiplexer 110 selects the set of input communication lines corresponding to the video data provided by the microcontroller 106. Accordingly, the video adapter 104, during the pre-boot environment, routes the video data that is provided by the microcontroller 106 to the VGA connector 112.

In accordance with example implementations, the microcontroller 106 monitors operation of the USB-based video controller 108 for purposes of sensing, or detecting, when the USB-based video controller 108 is communicating with the USB-based video controller driver 146 of the computer platform 140. In this manner, the detection of this communication corresponds to the computer platform 140 being in the post-boot environment, i.e., the environment in which the USB-based video controller driver 146 is operational and controls the USB-based video controller 108 to produce video content.

In accordance with some implementations, the microcontroller 106 monitors an output of the USB-based video controller 108 for purposes of detecting features (called "video content-related features" herein) of the output, which are consistent with a video content. For example, in accordance with some implementations, the microcontroller 106 may monitor the output of the USB-based video controller 108 for purposes of detecting one or multiple synchronization signals (e.g., a horizontal synchronization signal and/or a vertical synchronization signal); detecting an embedded pixel clock; and so forth. In accordance with some implementations, the microcontroller 106 may determine that the USB-based video controller 108 is providing video content in response to the microcontroller 106 detecting a single video content-related feature in the output of the controller 108; and in accordance with further implementations, the microcontroller 106 may determine that the controller 108 is providing video content in response to the microcontroller 106 detecting multiple video content-related features in the output of the controller 108.

In accordance with example implementations, the microcontroller's management of the multiplexer's selection state depends on whether the microcontroller 106 determines that the USB-based video controller 108 is providing video content. For example, if the multiplexer 110 is currently routing the video content from the microcontroller 106 to the VGA connector 112, then, in response to the microcontroller 106 detecting that the USB-based video controller 108 is providing video content, the microcontroller 106 deselects the multiplexer's set of input communication lines corresponding to the microcontroller 106 and selects the multiplexer's set of input lines corresponding to the USB-based video controller 108. Conversely, if the multiplexer 110 is currently routing the video content from the USB-based video controller 108 to the VGA connector 112, but the microcontroller 106 no longer detects video content in the video controller's output (e.g., due to a reset of the computer platform 140) then the microcontroller 106 deselects the multiplexer's set of input communication lines corresponding to the video controller 108 and selects the multiplexer's set of input lines corresponding to the microcontroller's video content output. Therefore, in accordance with example implementations, the video adapter 104 autonomously controls the video source that provides video content to the VGA connector 112, depending on whether the computer platform 140 is in the pre-boot environment or in the post-boot environment; and this autonomous control occurs seamlessly from the perspective of a viewer of the monitor 170.

It is assumed that in the following description, the computer platform 140 is a blade server (and as such, the computer platform is referred to as the "blade server 140"), although it is understood that, in accordance with other implementations, the computer platform 140 may be a platform other than a blade server.

In accordance with example implementations, the blade server 140 may have a frame, or chassis 141; and one or multiple motherboards 143, which are mounted to the chassis 141. Each motherboard 143 may contain one or multiple hardware processors, such as one or multiple multicore central processing unit (CPU) semiconductor packages (or "sockets" or "chips"), one or multiple graphics processing unit (GPU), semiconductor packages, one or multiple Field Programmable Graphics Array (FPGA) processing units, one or multiple Application Specific Integrated Circuit (ASICs), and so forth. In accordance with example implementations, the blade server may provide multiple nodes (where each node corresponds to one or multiple CPU processing cores, for example) for a cluster of nodes. In accordance with example implementations, the blade server 140 may have a form factor, mechanical latch(es) and corresponding electrical connectors for purposes of allowing the blade server 140 to be installed in and removed from a corresponding blade server opening, or slot, in a rack-mounted blade server enclosure (or "blade server chassis module"). As a more specific example, in accordance with some implementations, the blade server 140 may contain two motherboards 143, and each motherboard 143 may contain four nodes, where each node may be formed from multiple CPU processing cores.

In accordance with example implementations, among its other features, the housing 105 of the video adapter 104 encloses the components of the video adapter 104, such as the microcontroller 106, the USB-based video controller 108 and the multiplexer 110. Moreover, in accordance with example implementations, the VGA connector 112 may be exposed outside of the housing 105 and extend through a front face portion 107 (relative to the orientation depicted in FIG. 1A) of the housing 105; and the RS-232 connector 120 and the USB connector 122 may extend through the rear face portion 109 of the housing 105.

In accordance with example implementations, the video adapter 104 may contain one or multiple additional exterior connectors. For example, in accordance with some implementations, the video adapter 104 may include an exterior RS-232 connector 113 (that extends through the front face portion 107 of the housing 105, for the example implementation of FIG. 1A). In accordance with example implementations, the RS-232 connector 113 may provide data that represents the serial stream of data that is received at the video adapter's RS-232 connector 120. In this manner, in accordance with some implementations, the microcontroller 106 may mirror the data that is received at the RS-232 connector 120 to the RS-232 connector 113, and this mirroring of the serial data occurs, in accordance with example implementations, during both the pre-boot and post-boot environments of the blade server 140. This mirroring allows the functionality of the blade server's RS-232 connector 147 to be maintained (via the RS-232 connector 113) while the video adapter 104 is connected to the connector 147.

Although FIG. 1A does not depict a connection for the user to provide input to the blade server 140, it is understood that the user may connect a cable (e.g., a USB cable) to the server 140 for purposes of providing input (e.g., keyboard input, mouse input and so forth) to the server 140.

Figure 2:
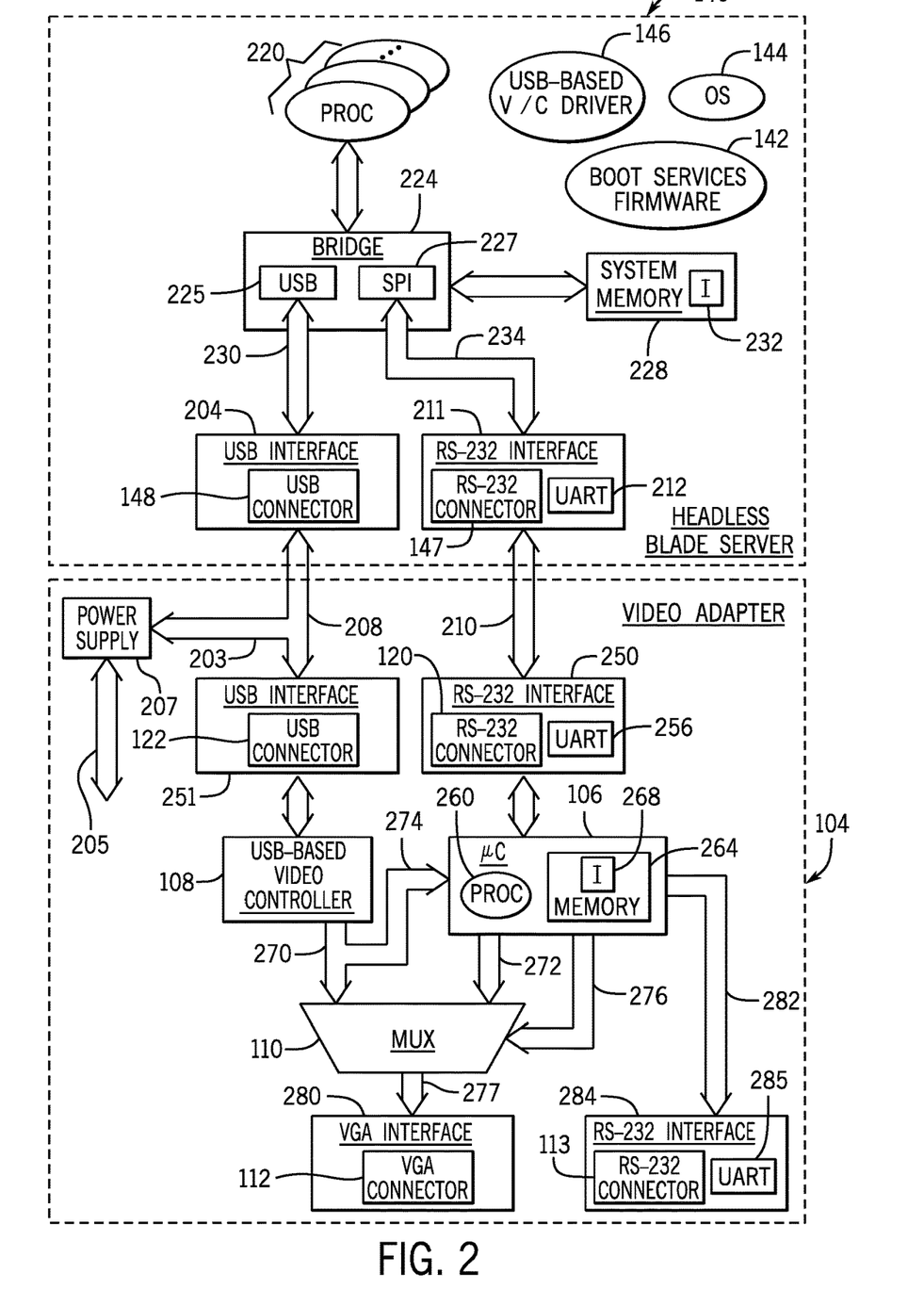
FIG. 2 depicts schematic diagrams of the blade server and the video adapter according to an example implementation.

FIG. 2 is an illustration of an architecture of the blade server 140 and the video adapter 104, in accordance with example implementations. Referring to FIG. 2 in conjunction with FIG. 1A, in accordance with some implementations, the blade server 140 includes one or multiple hardware processors 220 (e.g., one or multiple CPUs, GPUs, FPGAs, ASICs, and so forth) and a system memory 228 that stores machine-executable instructions 232 (i.e., "software"). In accordance with example implementations, the system memory 228 and other memories that are discussed herein are non-transitory storage media that may be formed from semiconductor storage devices, memristor-based storage devices, magnetic storage devices, phase change memory devices, a combination of devices of one or more of these storage technologies, and so forth. The system memory 228 may represent a collection of both volatile memory devices and non-volatile memory devices.

In general, the instructions 232 represent any of a number of different instructions that may be executed by the processor(s) 220, such as, BIOS instructions, UEFI instructions, POST instructions, operating system instructions, hypervisor instructions, device driver instructions, application instructions, and so forth. In this manner, the instructions 232 may be executed by one or multiple processors 220 and may correspond to the boot services firmware 142, the operating system 144, the USB-based video controller driver 146, a hypervisor, application instances, container instances, virtual machine instances, and so forth.

The blade server 140, in accordance with example implementations, includes a bus infrastructure, which includes one or multiple bridges 224. In general, the bridge(s) 224 route communications between the processor(s) 220 and components of the blade server 140, such as the system memory 228, a trusted platform module (TPM) (not depicted in FIG. 2), a network interface (not depicted in FIG. 2), a USB interface 204 and an RS-232 interface 28. The bridge(s) 224 are connected to buses of the blade server 140.

The bridge 224 may take on a number of different forms and be formed by one or multiple components of the blade server 140, in accordance with different implementations. For example, in accordance with some implementations, the bridge(s) 224 may include a north bridge 224 and a south bridge 224. For example, the blade server 140 may include a north bridge 224 that includes a memory controller (for system memory 228 accesses) and PCIe ports; and the south bridge 224 may provide I/O ports, such as Serial Advanced Technology Attachment (SATA) ports, USB ports 225, Low Pin Count (LPC) ports, Serial Peripheral Interconnect (SPI) ports 227, extended SPI (eSPI) ports, and so forth. In accordance with some implementations, the north bridge 224 may be part of the processor 220. In accordance with further example implementations, the above-described north and south bridges may be combined into a single bridge 224; and in accordance with some implementations, this single bridge 224 may be part of the processor 220.

In accordance with some implementations, the blade server 140 may include a USB bus 230 that is coupled between a particular USB port 225 of the bridge(s) 224 and the USB interface 204. The USB interface 204 represents the physical layer of the blade server 140 associated with the USB connector 148. In this regard, the USB interface 204 may include the USB connector 148, drivers, level shifters, and so forth, for purposes of driving and receiving signals that appear on the communication terminals of the USB connector 148. In accordance with some implementations, a particular port of the bridge(s) 224 may be coupled to a bus 234 for purposes of communicating with an RS-232 interface 211 of the blade server 140. As a more specific example, in accordance with some implementations, the processor 220 may contain an SPI bus interface that is coupled to an SPI port 227 of the bridge(s) 224; and the bridge(s) 224 may convert the SPI interface into a serial interface. In general, the RS-232 interface 211 represents the physical layer that is associated with the RS-232 connector 147. In addition to the RS-232 connector 147, the RS-232 interface 211 may contain, for example, a Universal Asynchronous Receiver/Transmitter (UART) 212. In general, the UART 212 provides a one-to-one communication path (at a particular time) between two endpoints for either transmitting or receiving data. For purposes of providing an output for the blade server 140, the UART 212 transmits a serial stream of data, which may, for example, represent messages written by the boot services firmware 142.

In general, a USB interface 251 of the video adapter 104 forms the physical layer that is associated with the USB connector 122; and, in addition to the USB connector 122, the USB interface 251 may include additional components, such as drivers, receivers, level shifters, and so forth. The USB interface 251 is coupled to the USB interface 204 of the blade server 140 by a USB connection 208 that is established by the USB cable 154 (FIG. 1A). The video adapter 104 includes an RS-232 interface 250 that forms the physical layer that is associated with the RS-232 connector 120; and, in addition to the RS-232 connector 120, the RS-232 interface 250 may include a UART 256, and additional components, such as drivers, receivers, level shifters, and so forth. The RS-232 interface 250 is coupled to the RS-232 interface 211 of the blade server 140 by an RS-232 connection 210 that is established by the RS-232 cable 150 (FIG. 1A).

In accordance with some implementations, the video adapter 104 may include a power supply 207 that is coupled to the USB connection 208 (as indicated at reference number 203) for purposes of receiving input power from the USB connection 208. In general, the power supply 207 conditions (e.g., filters, converts voltages, and so forth) the power that is received from the USB connection 208 for purposes of providing one or multiple supply voltages to corresponding voltage supply rails 205 of the video adapter 104. As such, in accordance with some implementations, when the video adapter 104 is hot-plugged into the blade server 140 (i.e., when the hot plug connection is made with the server's USB connector 204), the video adapter 104 powers up, initializes, and then begins providing video content for the blade server 140.

In accordance with further example implementations, the video adapter 104 may be powered by a power source (e.g., a battery or AC wall voltage) other than a USB connection-based power source.

In accordance with example implementations, the microcontroller 106 is coupled to the RS-232 interface 250 for purposes of receiving serial data from the interface 250. The microcontroller 106 converts the serial data into text-based video content and provides the video content to input communication lines 272 of the multiplexer 110. As also depicted in FIG. 2, in accordance with example implementations, the microcontroller 106 provides an output to a selection state input line 276 of the multiplexer 110. In accordance with example implementations, an output of the USB-based video controller 208 is provided to another set of input lines 270 of the multiplexer 110. Moreover, output lines 277 of the multiplexer 110 are coupled to a VGA interface 280, which contains the VGA connector 112. In accordance with some implementations, the VGA interface 280 represents the physical layer associated with the VGA connector 112 and may include, as an example, current digital-to-analog converters (DACs), drivers, level shifters, and so forth.

As also depicted in FIG. 2, in accordance with some implementations, the microcontroller 106 has an input 274 that is coupled to the output of the USB-based video controller 108 for purposes of monitoring signals that are produced by the video controller 108. By monitoring these signals, the microcontroller 106 may determine whether or not the blade server 140 is in the post-boot environment.

In accordance with example implementations, the microcontroller 106 may include one or multiple hardware processing cores 260 (e.g., CPU processing cores) and a memory 264. In general, the processing core(s) 260 may execute instructions 268 that are stored in the memory 264 for purposes of managing the video adapter 104. This management, among other possible actions, may include converting RS-232 data into data representing video content; controlling the selection state of the multiplexer 110; and monitoring the output of the USB-based video controller 108 for purposes of determining whether the controller 108 is providing video content.

Figure 3:
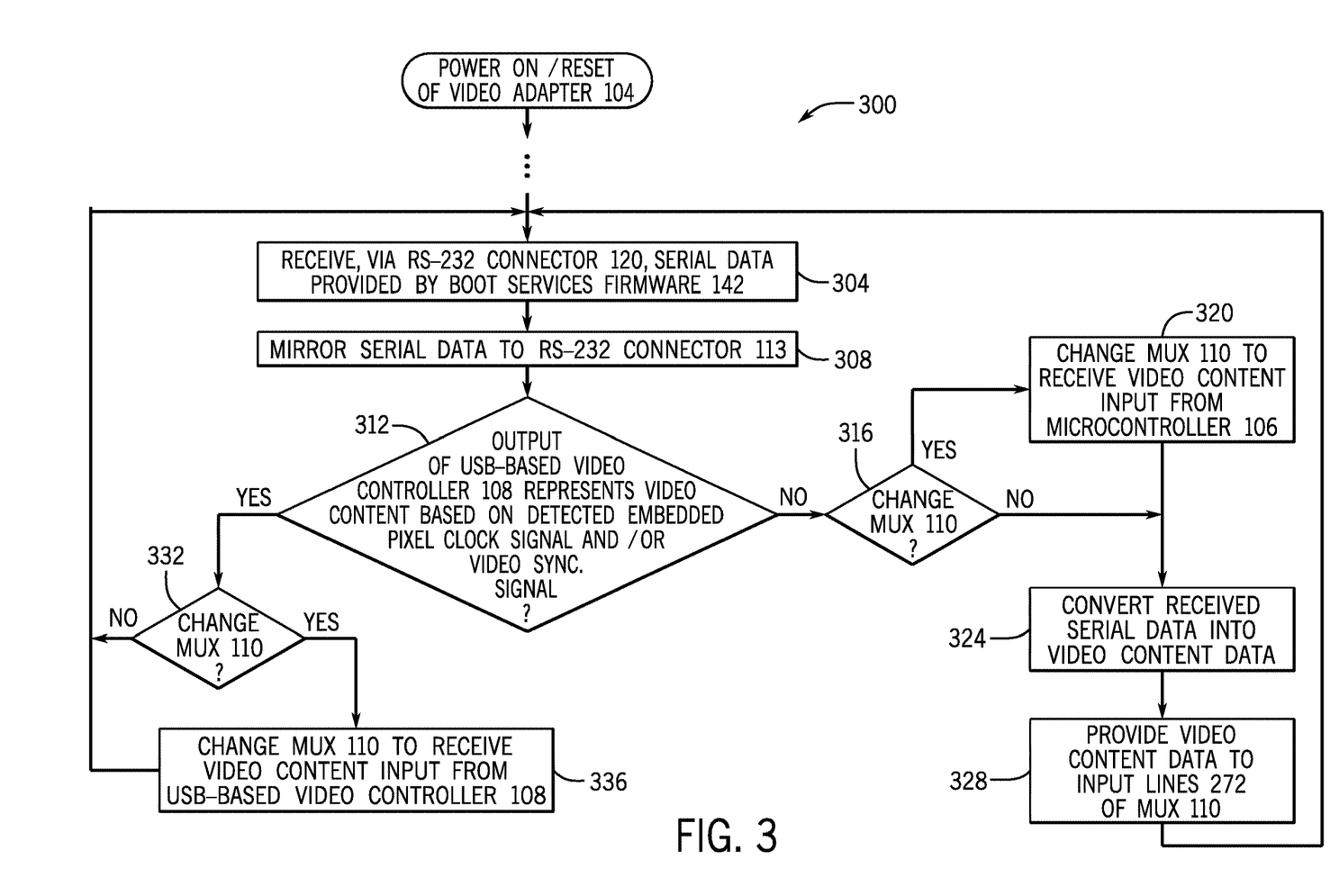
FIG. 3 is a flow diagram depicting a process of a microcontroller of the video adapter to manage the video adapter according to an example implementation.

Referring to FIG. 3 in conjunction with FIG. 2, in accordance with example implementations, the processor(s) 260 may execute the instructions 268 for purposes of performing a process 300 to manage the video adapter 104. Although FIG. 3 depicts a sequence of actions, in accordance with example implementations, one or multiple of the actions that are depicted in FIG. 3 may be performed in parallel by multiple processing cores 260 of the microcontroller 106. Moreover, in accordance with further example implementations, a single processor core 260 of the microcontroller 106 may execute the actions depicted in FIG. 3 in a non-parallel fashion.

In accordance with example implementations, the process 300 begins in response to the video adapter 104 powering on or being reset. This may occur, in accordance with some implementations, when the video adapter 104 is hot-plugged into the blade server 140 (e.g., when the video adapter 104 is hot-plugged into the blade server's USB connector 148). At this point, when the hot-plugging occurs at the video adapter 104 powers on, the blade server 140 may be either in the pre-boot environment or in the post-boot environment. In accordance with example implementations, the video adapter 104 powers up with the multiplexer 110 being in a default selection state, which causes the multiplexer 110, by default, to route the output of the microcontroller 106 (i.e., the video content produced by the microcontroller 106) to the VGA connector 112. The microcontroller 106 may thereafter change (and potentially rechange multiple times) the selection state of the multiplexer 110, depending on the environment of the blade server 140. The process 300 takes into account that the environment of the blade server 140 may change over time (e.g., the blade server 140 may be in the post-boot environment, may then be rebooted to placed the blade server 140 in the pre-boot environment and then transition to the post-boot environment).

Pursuant to block 304 of the process 300, the microcontroller 106 receives, via the RS-232 connector 120, serial data that is provided by the boot services firmware 142 of the blade server 140. As depicted in block 308, the microcontroller 106 may mirror (block 308) the received serial data to the RS-232 connector 113. Pursuant to decision block 312, the microcontroller 106 determines whether the output of the USB-based video controller 108 represents video content based on one or multiple features of the output, such as a detected embedded pixel clock signal and/or a detected video synchronization signal. If the output of the USB-based video controller 108 does not represent video content, then the microcontroller 106 determines (decision block 316) whether to change the selection state of the multiplexer 110 to receive video content input from the microcontroller 106, and if the multiplexer 110 is currently configured to route video content from the USB-based video controller 108 to the VGA connector 112, then the microcontroller 106 changes (block 320) the selection state of the multiplexer 110 to cause the multiplexer 110 to route video content from the microcontroller 106 to the VGA connector 112.

Pursuant to block 324, the microcontroller 106 converts the received serial data into video content data and provides (block 328) the video content data to the input lines 272 of the multiplexer 110 before control returns to block 304. If, pursuant to decision block 312, the microcontroller 106 determines that the output of the USB-based video controller 108 represents video content, then the microcontroller 106 determines (decision block 332) whether the selection state of the multiplexer 110 should be changed, and if the multiplexer 110 is currently configured to route video content from the microcontroller 106 to the VGA connector 112, then the microcontroller 106 changes (block 336) the selection state of the multiplexer 110 to cause the multiplexer 110 to route video content from the USB-based video controller 108 to the VGA connector 112. Control then returns to block 304.

Figure 4:
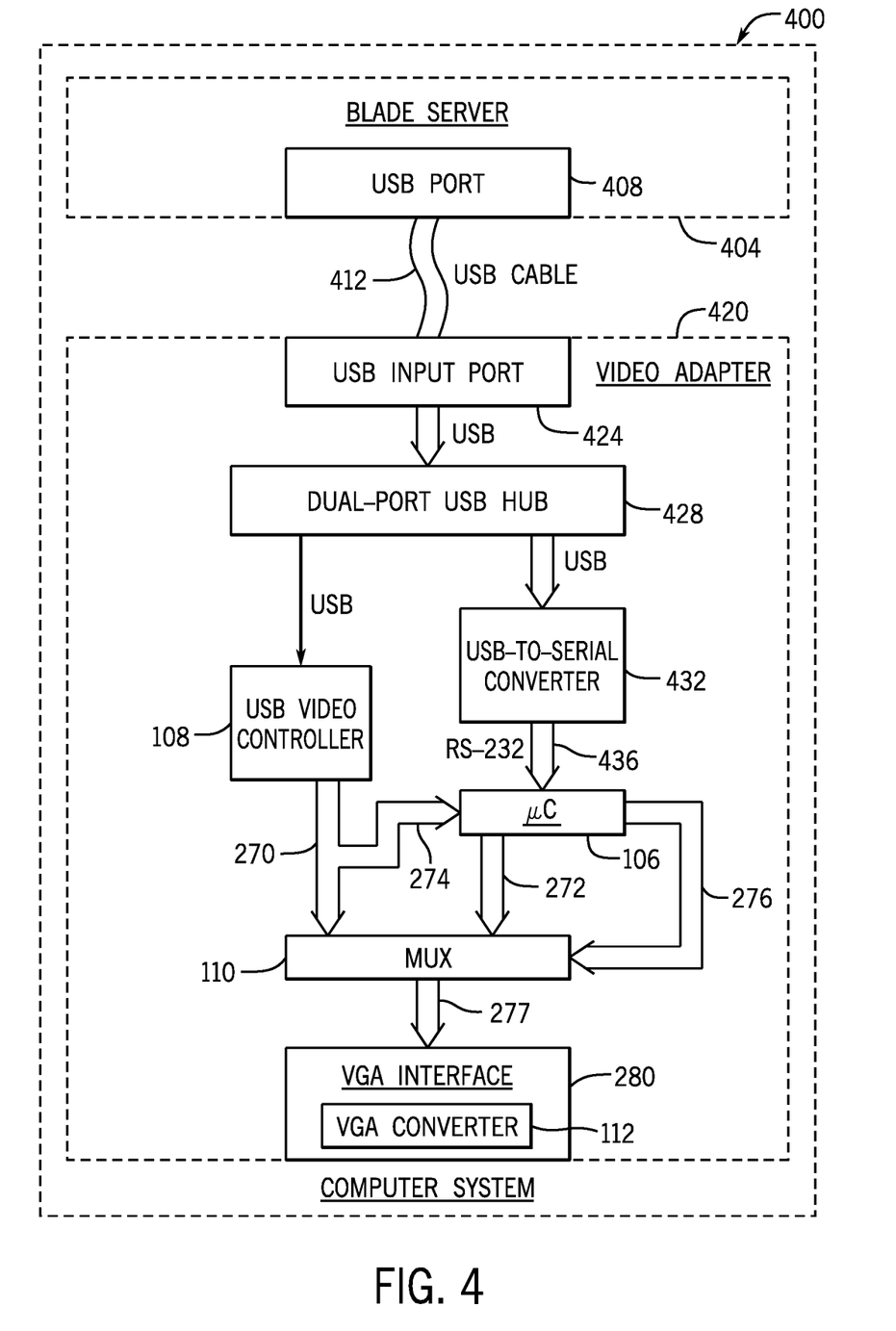
FIG. 4 is a schematic diagram of a video adapter according to a further example implementation.

FIG. 4 depicts an example computer system 400, in accordance with further example implementations, which includes a video adapter 420 that may be connected to a single connector of a computer platform, such as a blade server 404. Moreover, in accordance with example implementations, the video adapter 420 may not be external to the computer platform. For example, in accordance with some implementations, the components of the video adapter 420 may mounted to a midplane circuit substrate, or circuit board, and the midplane circuit board may be attached to a frame, or chassis, of the blade server 404.

The video adapter 420, in accordance with example implementations, shares components in common with the video adapter 104 (see FIG. 2), with the same reference numerals being used in FIGS. 2 and 4 to identify these components. Unlike the video adapter 104, the video adapter 420 receives a single output from the blade server 404 via a single USB port 408 (e.g., a hot-pluggable USB port, such as, for example, a port associated with a connector mounted on a motherboard of the blade server 404). More specifically, in accordance with some implementations, a USB input port 424 of the video adapter 420 receives the output that is provided by the USB port 408. As an example, a USB cable 412 may be connected between connectors corresponding to the USB port 408 and USB input port 424.

In accordance with example implementations, the video adapter 420 includes a dual-port USB hub 428, which splits the single incoming USB connection into two separate USB connections: a first USB connection for a USB-to-serial converter 432; and a second USB connection for the USB-based video controller 108. The USB-to-serial converter 432 provides RS 232 data 436 to the microcontroller 106. In accordance with example implementations, in the pre-boot environment of the blade server 404, boot services firmware of the blade server 404 writes message data to the USB port 408, and in the post-boot environment of the blade server 404, a USB-based video driver of the blade server 404 drives the USB-based video controller 108 via the USB port 408.

Figure 5:
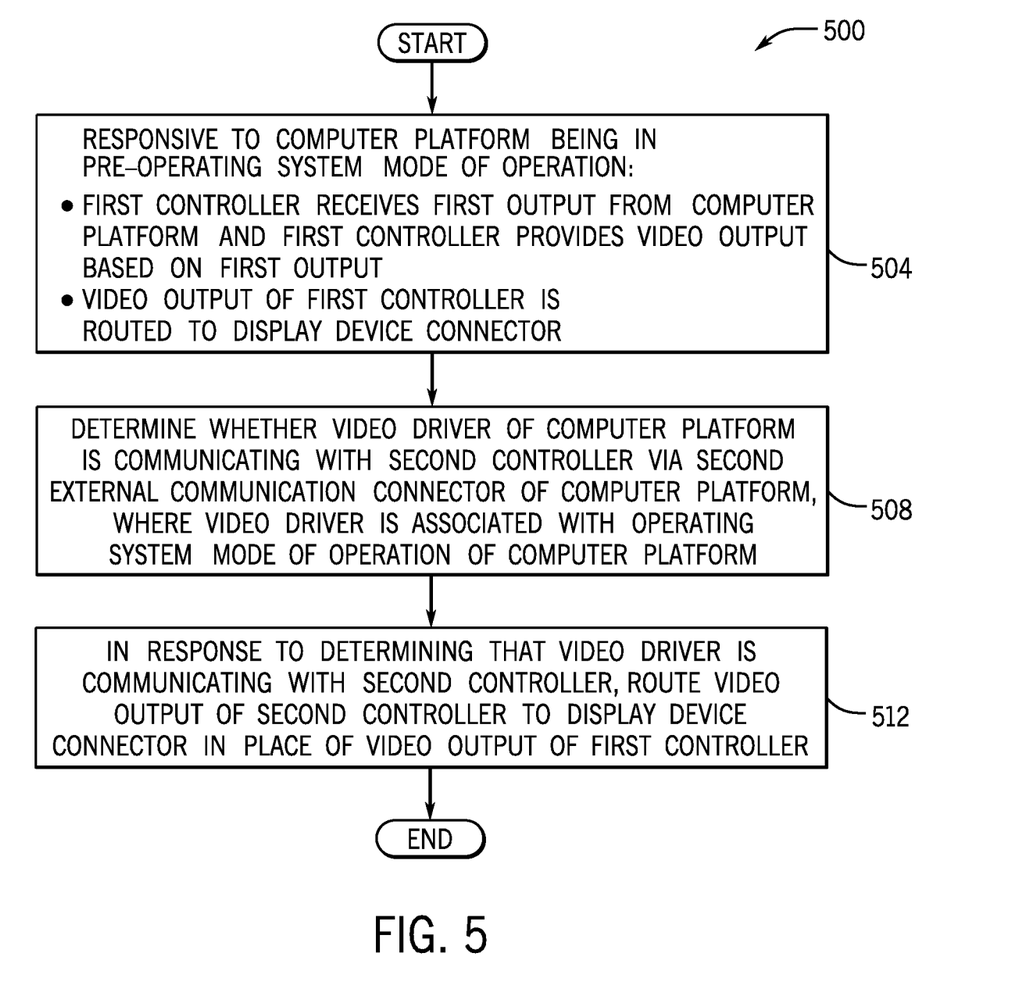
FIG. 5 is a flow diagram of a process to provide a video output for a computer platform according to an example implementation.

Referring to FIG. 5, in accordance with example implementations, a process 500 includes (pursuant to block 504), responsive to a computer platform being in a pre-operating system mode of operation, a first controller receiving a first output from the computer platform and providing a video output based on the first output. Also responsive to the computer platform being in the pre-operating system mode of operation, the video output of the first controller is routed to a display device connector. The process 500 includes, determining (block 508) whether a video driver of the computer platform is communicating with a second controller via a second external communication connector of the computer platform. The video driver is associated with an operating system mode of operation of the computer platform. The process 500 includes, in response to determining that the video driver is communicating with the second controller, routing (block 512) a video output of the second controller to the display device connector in place of the video output of the first controller.

Figure 6:
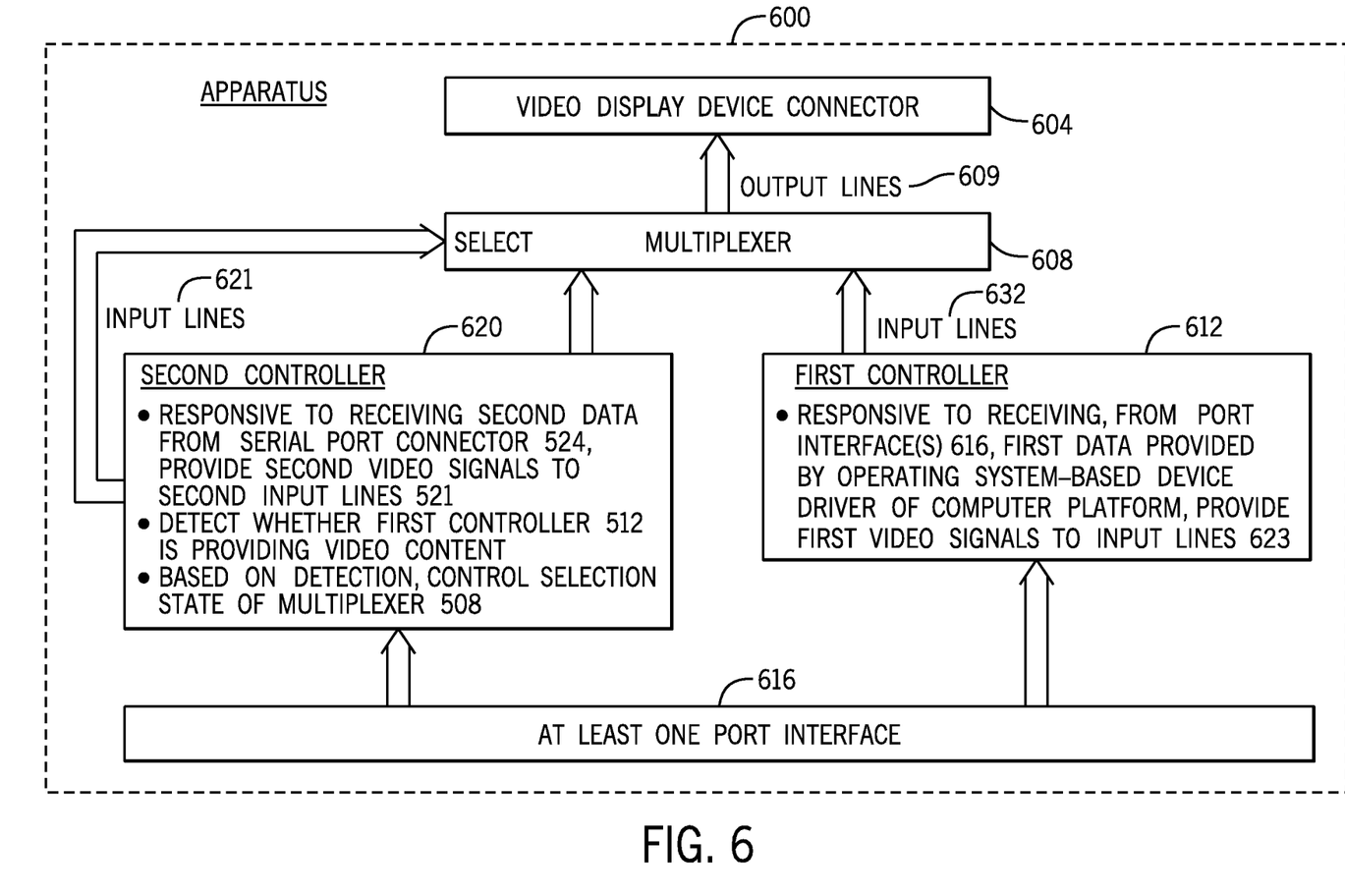
FIG. 6 is a schematic diagram of an apparatus to provide video signals for a computer platform according to an example implementation.

Referring to FIG. 6, in accordance with example implementations, an apparatus 600 includes a video display device connector 604, a multiplexer 608, a first controller 612 and a second controller 620. The multiplexer 608 includes output lines 609, input lines 623 and input lines 621. The output lines 609 are coupled to the video display device connector 604. The first controller 612 is to be coupled to at least one port interface 616; and the first controller 612 to, responsive to receiving, via the port interface(s) 616, first data provided by an operating system-based device driver of the computer platform, provide first video signals to the input lines 623. The second controller 620 is to be coupled to the port interface(s) 616. The second controller 620 is to, responsive to receiving second data from the port interface(s) 616, provide second video signals to the input lines 621; detect whether the first controller 612 is providing a video content; and based on the detection, control a selection state of the multiplexer 508.

Figure 7:
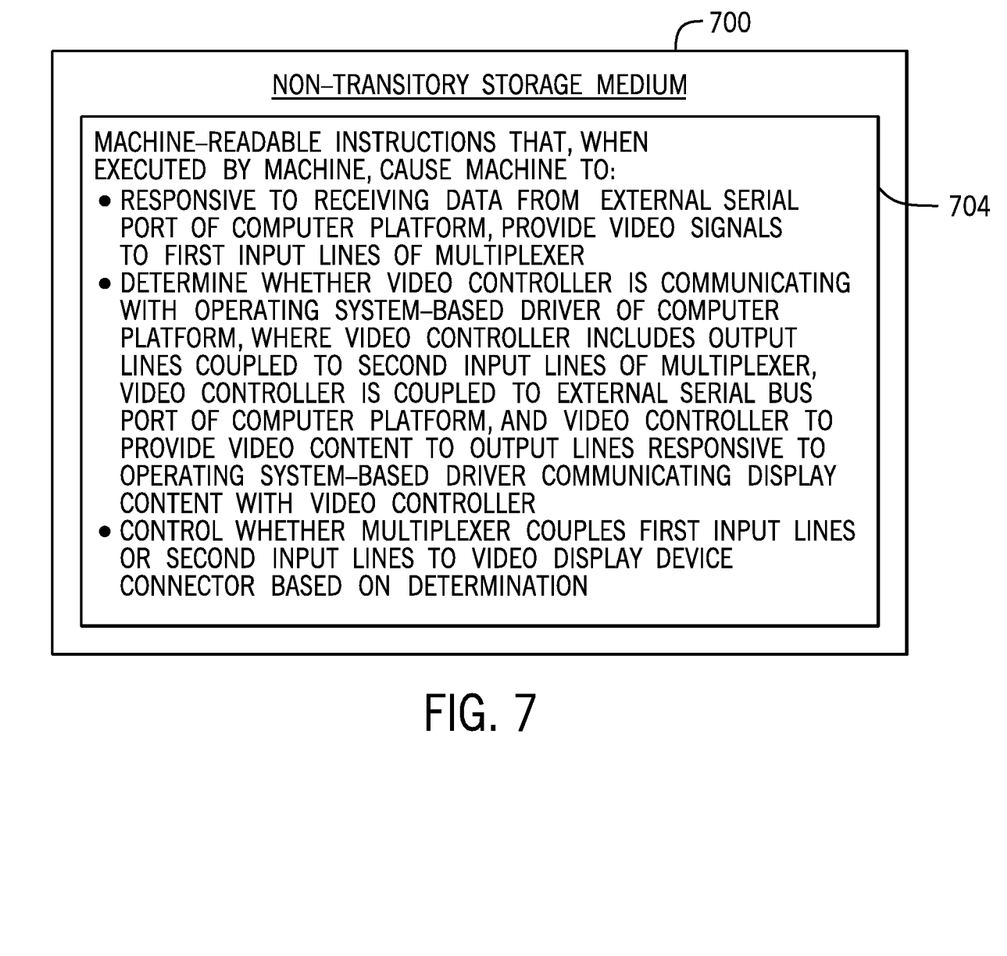
FIG. 7 is an illustration of machine-readable instructions that are stored on a non-transitory storage medium that, when executed by a machine, cause the machine to provide a video content for a computer platform according to an example implementation.

Referring to FIG. 7, in accordance with example implementations, a non-transitory storage medium 700 stores machine-readable instructions 710 that, when executed by a machine, cause the machine to, responsive to receiving data from at least one port interface of a computer platform, provide video signals to first input lines of a multiplexer. The instructions 710, when executed by the machine, further cause the machine to determine whether a video controller is communicating with an operating system-based driver of the computer platform. The video controller includes output lines that are coupled to second input lines of the multiplexer; the video controller is coupled to the port interface(s) of the computer platform; and the video controller is to provide the video content to the output lines responsive to the operating system-based driver communicating display content with the video controller. The instructions 710, when executed by the machine, further cause the machine to control whether the multiplexer couples the first input lines or the second input lines to a video display device connector based on the determination.

In accordance with example implementations, the controller providing the video output includes the controller generating a text-based video output, and the other controller provides a graphical-based video output. A particular advantage is that video content that is provided to a display device may be optimally selected such that text character-based video content may be viewed on the display when a graphical-based video content is unavailable, and when the graphical-based video content is available, the graphical-based video content is displayed in place of the text character-based video content.

In accordance with example implementations, determining whether the video driver is communicating with a given controller includes another controller monitoring an operation of the given controller and the other controller, responsive to the monitoring, controlling a multiplexer to control whether the video output of the given controller or the video output of the other controller is routed to the display device connector. A particular advantage is that video content that is provided to a display device may be optimally selected such that text character-based video content may be viewed on the display when a graphical-based video content is unavailable, and when the graphical-based video content is available, the graphical-based video content is displayed in place of the text character-based video content.

In accordance with example implementations, the other controller monitoring the operation of the given controller includes the other controller detecting presence of the video output of the given controller. A particular advantage is that video content that is provided to a display device may be optimally selected such that text character-based video content may be viewed on the display when a graphical-based video content is unavailable, and when the graphical-based video content is available, the graphical-based video content is displayed in place of the text character-based video content.

In accordance with example implementations, detecting the presence of the video output includes detecting at least one of a clock signal or a synchronization signal. A particular advantage is that video content from the video controller may be monitored for purposes of detecting whether the computer platform is in a pre-boot environment or a post-boot environment.

In accordance with example implementations, boot services firmware of the computer platform writes messages to a serial port of the computer platform; and the serial port provides the serial data to an external communication connector in response to the writing. A particular advantage is that the serial port functionality of the computer platform is maintained for purposes other than the video adapter's use of the computer platform's serial port.

In accordance with example implementations, the controller providing the video output includes the controller performing at least one of providing a video output representing a result of a power-on self test (POST); providing a video output representing a menu to select configuration options for the computer platform; or providing a video output representing a firmware interface shell. A particular advantage is that video content that is provided to a display device may be optimally selected such that text character-based video content may be viewed on the display when a graphical-based video content is unavailable, and when the graphical-based video content is available, the graphical-based video content is displayed in place of the text character-based video content.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
responsive to a computer platform being in a pre-operating system mode of operation:
a first controller receiving a first output of the computer platform and the first controller providing a video output based on the first output; and
routing the video output of the first controller to a display device connector;
determining whether a video driver of the computer platform is communicating with a second controller via a second external communication connector of the computer platform, wherein the video driver is associated with an operating system mode of operation of the computer platform; and
in response to determining that the video driver is communicating with the second controller, routing a video output of the second controller to the display device connector in place of the video output of the first controller.

2. The method of claim 1, wherein the first controller providing the video output comprises the first controller generating a text-based video output, the method further comprising the second controller providing a graphical-based video output.

3. The method of claim 1, wherein determining whether the video driver is communicating with the second controller comprises the first controller monitoring an operation of the second controller, the method further comprising:
the first controller, responsive to the monitoring, controlling a multiplexer to control whether the video output of the first controller or the video output of the second controller is routed to the display device connector.

4. The method of claim 3, wherein the first controller monitoring the operation of the second controller comprises the first controller detecting presence of the video output of the second controller.

5. The method of claim 4, wherein the first controller detecting the presence of the video output of the second controller comprises at least one of detecting a clock signal or detecting a synchronization signal.

6. The method of claim 1, further comprising:
boot services firmware of the computer platform writing messages to a serial port of the computer platform; and
the serial port providing the serial data to the first external communication connector in response to the writing.

7. The method of claim 1, wherein the first controller receiving the output from the computer platform comprises the first controller receiving the output from a serial port of the computer platform.

8. The method of claim 1, wherein the first controller receiving the output from the computer platform comprises:
receiving data from a serial bus port of the computer platform;
providing two serial bus streams of data responsive to receiving the data from the serial bus port; and
converting a serial bus stream of data of the serial bus streams of data into serial data; and
providing the video output based on the serial data.

9. The method of claim 1, wherein the first controller providing the video output comprises the first controller performing at least one of:
providing a video output representing a result of a power on self test (POST);
providing a video output representing a menu to select configuration options for the computer platform; or
providing a video output representing a firmware interface shell.

10. The method of claim 1, wherein the first controller receiving serial data from the first external communication connector comprises the first controller communicating with a universal asynchronous receiver/transmitter (UART) of the computer platform, the method further comprising:
the first controller mirroring the received serial data to another communication connector, wherein the mirroring comprises the first controller providing the serial data to a UART associated with the another communication connector.

11. An apparatus comprising:
a video display device connector;
a multiplexer comprising output lines, first input lines and second input lines, wherein the output lines are coupled to the video display device connector;
a first controller to be coupled to at least one port interface, wherein the first controller to, responsive to receiving, via a bus connector, first data provided by an operating system-based device driver of the computer platform, provide first video signals to the first input lines; and
a second controller to be coupled to the at least one port interface, wherein the second controller to:
responsive to receiving second data from the at least one port interface, provide second video signals to the second input lines;
detect whether the first controller is providing a video content; and
based on the detection, control a selection state of the multiplexer.

12. The apparatus of claim 11, wherein the second controller controls the selection state of the multiplexer to cause the multiplexer to, in response to failure of the second controller to detect that the first controller is providing video content, couple the second input lines to the output lines.

13. The apparatus of claim 11, wherein the second controller controls the selection state of the multiplexer to cause the multiplexer to, in response to the second controller detecting that the first controller is providing video content, couple the first input lines to the output lines.

14. The apparatus of claim 11, wherein the first controller comprises a Universal Serial Bus (USB)-based video controller, and the second controller comprises a microcontroller.

15. The apparatus of claim 11, further comprising:
a circuit board assembly, wherein the video display device connector, the multiplexer, the first controller and the second controller are mounted to the circuit board assembly;
a housing to at least partially enclose the circuit board assembly;
a second serial bus connector to be coupled to the first serial bus connector of the computer platform, wherein the second serial bus connector is mounted to the circuit board assembly and is exposed outside of the housing; and
a second serial port connector to be coupled to the first serial port connector of the computer platform, wherein the second serial port connector is mounted to the circuit board assembly and is exposed outside of the housing.

16. The apparatus of claim 15, further comprising:

a third serial port connector mounted the circuit board assembly and exposed outside of the housing, wherein the second controller to mirror the second data to the third serial port connector.

17. A non-transitory storage medium to store machine-readable instructions that, when executed by a machine, cause the machine to:

responsive to receiving data from at least one port interface of a computer platform, provide video signals to first input lines of a multiplexer;

determine whether a video controller is communicating with an operating system-based driver of the computer platform, wherein the video controller comprises output lines coupled to second input lines of the multiplexer, the video controller is coupled to the port interface(s) of the computer platform, and the video controller is to provide the video content to the output lines responsive to the operating system-based driver communicating display content with the video controller; and control whether the multiplexer couples the first input lines or the second input lines to a video display device connector based on the determination.

18. The storage medium of claim 17, wherein the external serial bus port comprises a one-to-many serial communication port, and the external serial port comprises a one-to-one serial communication port.

19. The storage medium of claim 17, wherein the external serial bus connector comprises a universal serial bus (USB) connector, and the video controller comprises a USB video controller.

20. The storage medium of claim 17, further comprising instructions that, when executed by the machine, cause the machine to determine whether the video controller is communicating with the operating system-based driver based on an output of the video controller.

\* \* \* \* \*